United States Patent Office 3,367,627
Patented Feb. 6, 1968

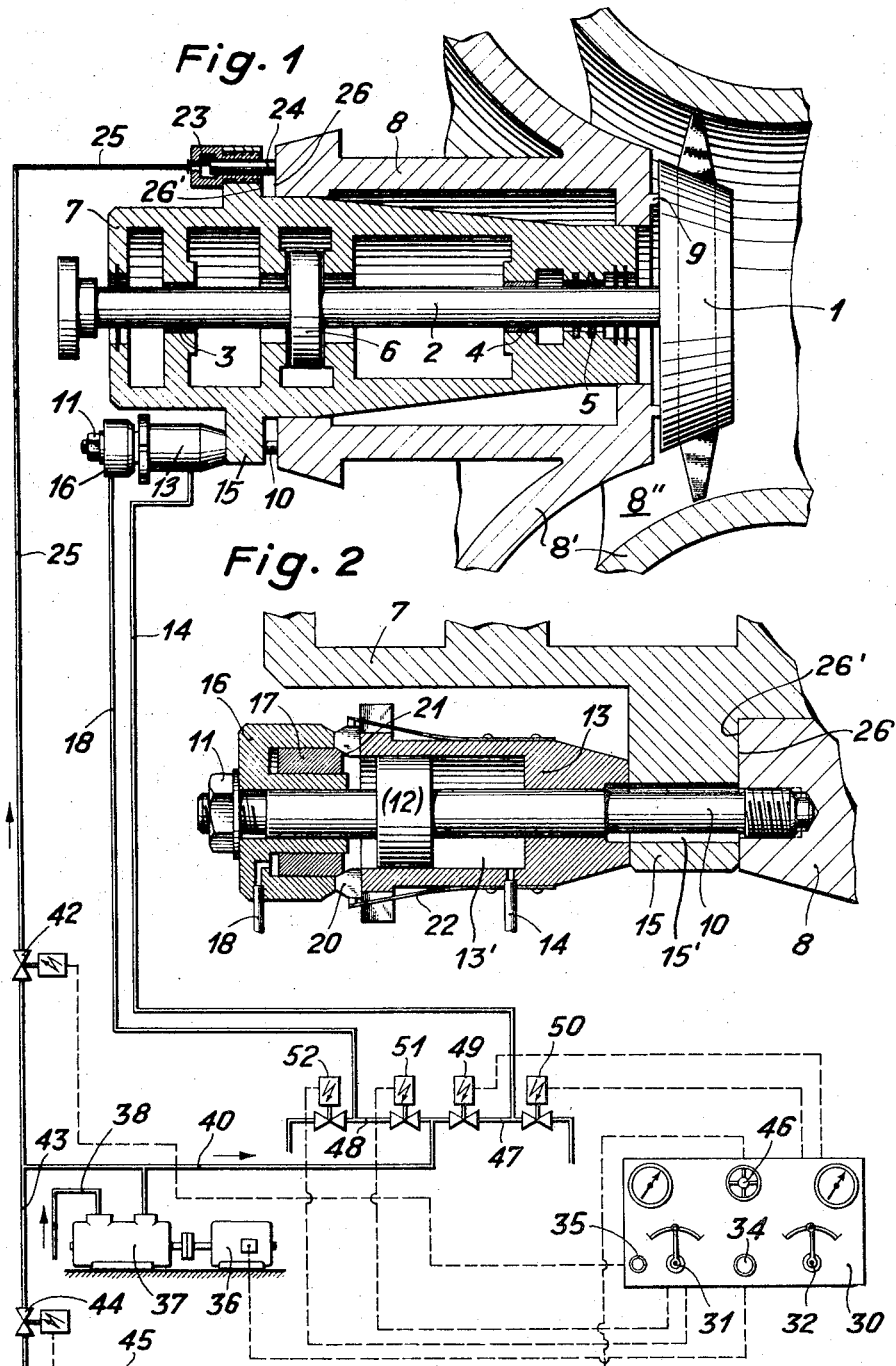

3,367,627
TURBINE-TYPE MACHINE CONSTRUCTION
Hans Benz, Winterthur, Switzerland, assignor to Sulzer Brothers Limited, Winterthur, Switzerland, a Swiss company
Filed Feb. 5, 1965, Ser. No. 430,713
Claims priority, application Switzerland, Feb. 14, 1964, 1,877/64
8 Claims. (Cl. 253—39)

The present invention relates to a turbine-type machine such as a turboblower having an axially movable rotor so that when the rotor is stopped, a gas-tight seal may be effected between the rotor and the aperture through which the rotor enters the casing in which it turns. The invention provides a turbine of this type, usable for example as a blower, in which this axial motion of the rotor is provided for by means of a bearing housing which supports the bearings and shaft seal (and thereby the rotor), the bearing housing being axially movable with respect to an outer housing or support fixed with reference to the casing in which the rotor turns. In accordance with the invention the bearing housing is removably held in this support in the operating position for the rotor by retaining elements which act against the outer housing through removable spacers. The invention provides remote control means for withdrawal of these spacers to permit axial shift of the bearing housing and of the rotor therewith in order to seal the rotor against its casing so as to provide the gas-tight seal abovedescribed.

It has been heretofore proposed to construct turboblowers, for example for use in circulating a gaseous heat exchange medium in a nuclear reactor, with rotors which are axially movable in order to permit the rotor when stopped to seal off the closed cycle coolant flow path from the exterior and indeed from the seal on the rotor shaft. With such a construction, examination, repair and replacement of the shaft seal and shaft bearings is facilitated. Additionally, it is possible with such a construction to remove the gas pressure load on the shaft seal whenever the rotor is stopped. It is an object of the invention to provide apparatus whereby such sealing off may be simply and rapidly effected in event of a malfunction of the blower, or in the event of temporary stoppage thereof.

The invention will now be further described in terms of an exemplary embodiment with reference to the accompanying drawings in which:

FIG. 1 is an axial section through a turboblower according to the invention, together with a diagrammatic representation of remote control means for axial shift of the rotor thereof; and FIG. 2 is a sectional view at an enlarged scale of a portion of the apparatus shown in FIG. 1.

Referring to FIG. 1, the blower rotor is shown at reference character 1. It is secured to a shaft 2 mounted in radial bearings 3 and 4. The shaft passes through a shaft seal 5 and is provided with a thrust bearing 6. The bearings 3, 4 and 6 and the shaft seal 5 are disposed in a bearing housing 7 which is axially movable in an outer housing 8 fixed with reference to the casing in which the rotor moves. This casing, indicated at 8', defines a flow channel 8" through which the blower is adapted to force a fluid medium, which may be gaseous. Upon such axial motion of the bearing housing 7, the rotor 1 of course moves with it. An annular packing or sealing ring 9 is disposed in the housing 8 about the shaft to cooperate with the left face of the rotor 1 (as seen in FIG. 1) when the rotor is axially shifted to the left, in order to provide a gas-tight seal between the rotor 1 and the casing 8', preventing the flow of gas within the casing to the exterior thereof and removing the load on shaft seal 5.

FIG. 1 illustrates the bearing housing 7 and rotor 1 axially shifted to the left whereby the rotor is drawn up against the packing 9 so as to provide the gas-tight seal of the rotor against the casing above-described. When the turbine is to be operated, the housing 7 with the shaft 2 and the rotor 1 supported thereby are shifted to the right so as to bring the plane annular surfaces 26 and 26' into into engagement with each other as indicated in FIG. 2. The surface 26 is formed on the outer housing 8 while the surface 26' is formed on a radially extending flange 15 of the bearing housing 7. The bearing housing 7 is movably secured to the outer housing 8 by means of a plurality of studs 10 which are threaded into the outer housing 8 as indicated in FIG. 2 and which are distributed about the axis of the turbine defined by the shaft 2 thereof. These studs pass through holes 15' (FIG. 2) in the flange and carry nuts 11 at the outer end thereof. Each stud 10 has affixed thereto a cylindrical portion of enlarged diameter forming a piston 12 as indicated in FIG. 2. Disposed about each stud there is provided an annular member 13 having a cylindrical cavity 13' therein which accommodates the piston 12 and which is connectable through a line 14 to a source of hydraulic fluid under pressure. There is additionally disposed about each of the studs a member 16 having approximately the form of a hollow nut and containing an annular piston 17. The hollow space between the end of the member 16 and the annular piston 17 is connectable through a line 18 to a source of fluid under pressure. The member 16 bears against the member 13 via a plurality of spacing elements 20. For each of the studs 10, the spacing elements 20 may make up a ring split across a number of diameters. Each of the spacers has an inclined surface or chamfer 21 at the radially inner side thereof, and the adjacent end of the annular piston 17 is provided with a mating chamfer, all as shown in FIG. 2. A plurality of leaf springs 22 is affixed to the outer surface of the member 13 and these springs bear at their free ends against the spacers 20, pressing them radially inward toward the axis of the stud 10. Thus when the spacers 20 are in the radially inner position therefor illustrated in FIG. 2, the housing 7 may be held in the home or operating position illustrated in FIG. 2 by means of the nuts 11. As to each of the studs 10, the nut 11 thereof exerts a stress on the flange 15 of the housing 7 via the member 16, the spacers 20 and the annular member 13.

Affixed to the housing 7 at the flange 15 thereof, and intercalated between the successive studs 10 peripherally about the blower axis, are a plurality of hydraulic cylinders 23. These cylinders are connectable by a line 25 to a source of hydraulic fluid under pressure. Each of the cylinders 23 contains a piston 24 bearing against the annular end face 26 of the outer housing 8.

For operation of the blower, the housing 7 and its shaft 2 are shifted to the right from the position of FIG. 1 to that fragmentarily shown in FIG. 2, so that the rotor 1 is spaced away from the seal 9. The shaft 2 is driven for example by means of an electric motor coupled to the flange shown at the left end of that shaft. By such rotation, the rotor circulates the fluid through the turbine casing which may for example be included in the coolant flow cycle of a reactor. Upon stoppage of the rotor, the bearing housing 7 is to be moved to the left so as to effect a seal between the rotor 1 and the packing ring 9. To this end hydraulic fluid is fed under pressure through the conduits 14 to the cylindrical chambers 13'. The hydraulic pressure thus applied stretches the studs 10 sufficiently so as to relieve the axial pressure on the spacers 20. Hydraulic fluid under pressure is then fed through the conduits 18 to drive the annular pistons 17 to the right. With such motion the spacers 20 are forced radially outward so as to permit the members 13 and 16 to approach each other. Hydraulic pressure to the conduits 14 is then cut off, and the rotor with its shaft and the entire housing 7 is free to move to the left, for example due to pressure within the duct 8″ defined by the turbine casing 8′. When the housing 7 has moved to the left far enough to preclude return of the spacers 20, the supply of hydraulic pressure to the conduits 18 can be shut off.

If the pressure within the duct 8″ in which the rotor is mounted is insufficient or if in the case of a vertical installation the weight of the rotor shaft and bearing housing is insufficient to effect axial displacement, the cylinders 23 can be pressurized through the conduits 25 in order to drive the housing 7 to the left by operation of the pistons 24.

When the housing 7 is to be shifted to the right in order to replace the turbine in operation, the chambers 13′ in the members 13 are pressurized via the conduits 14 so as to drive the housing 7 with the turbine rotor to the right. The studs 10 are again sufficiently elongated by this pressure to develop between the members 16 and 13 the clearance necessary to admit the spacers 20, and these are pressed into position between those members, as shown in FIG. 2, by action of the leaf springs 22. The supply of fluid under pressure to conduits 14 can then be cut off and the housing 7 will be held against the outer housing 8 by action of the members 13, 20 and 16 between the flange 15 on the housing 7 and the nuts on the studs 10.

The lower portion of FIG. 1 illustrates diagrammatically an installation for remote operation and control of the bearing housing in its axial shift between operative and inoperative positions for the rotor. There is shown a control console 30 having double throw switches 31 and 32, single throw switches 34 and 35 and a continuously adjustable control device 46. Switch 34 controls the motor 36 of an oil pump 37. The oil pump 37 delivers oil from a supply line 38 to a delivery line 40. Line 40 leads to the conduit 25 containing an electromagnetic valve 42 and thence via branch lines 25 (of which only one is shown) to the cylinders 23. Valve 42 is controlled by switch 35. A conduit 43 containing an overflow valve 44 is also connected to the delivery line 40. As illustrated, the valve 44 may be an electrically controlled valve and be actuated via adjusting device 46 by way of cable 45, so that the pressure in the hydraulic conduit 40 and in the conduits 25 and 43 can be adjusted from the control station 30. Also connected to the conduit 40 are two conduits 47 and 48, the former containing in series two electromagnetic valves 49 and 50 and the latter two such valves 51 and 52. Between the valves 49 and 50 the conduit 14 is connected to the conduit 47. Conduit 14 includes separate branches, one for each of studs 10. Between the valves 51 and 52 the conduit 18 is connected to the conduit 48, conduit 18 including likewise a branch for each stud. The valves 49 and 50 are separately opened by movements of the lever of switch 32 to its right-hand and left-hand positions respectively while valves 52 and 51 are opened by corresponding motions of the lever of the switch 31.

If the bearing housing 7 is required to be brought to the shut-off position, the driving motor coupled to shaft 2 is stopped and by means of the switch 34 the pump is started and the required pressure in line 40 is set up by adjustment of the device 46. The lever of switch 32 is then set to the right-hand position and the electromagnetic valve 49 is opened so as to permit the supply of pressure through line 14 to the chambers 13′ of the members 13. In this manner the studs 10 are stretched. The lever of switch 31 is then set to the left to open the valve 51 and pressurize the conduit 18. This causes the pistons 17 to move to the right and push out the spacers 20 around each of the studs 10.

If desired, the valve 42 can then be opened by means of switch 35 so that hydraulic pressure reaches the cylinders 23 via the line 25 and its branches. The lever of switch 32 is then moved from the right-hand position to the left-hand position so that the valve 49 is closed and valve 50 opened. The pressure in the chambers 13′ is thus released and the housing 7 can then move to the left in the drawing. By shifting switch 31 from left to right, valves 51 and 52 are respectively closed and opened, and pressure is accordingly released in line 18 and its branches. By releasing switch 35, pressure is also released in line 25 and the branches thereof.

For displacement of the housing 7 from left to right in FIGS. 1 and 2, in order to place the blower in operation, the pumping system 36, 37 is first set in operation and the valve 49 is then opened by means of switch 32. Hydraulic pressure applied to line 14 and its branches is then effective to shift the housing to the right. After the housing reaches the position shown in FIG. 2, continued application of hydraulic pressure to line 14 stretches the studs 10, and the spacers 20 are brought into position between the members 16 and 13 (as shown in FIG. 2) by means of the springs 22. Shift of switch 32 from right to left will then close valve 49 and open valve 50, releasing the pressure in line 14. Switch 32 may then be restored to its middle position in which neither of valves 49 and 50 is open, and the hydraulic pressure system 36, 37 can be switched off.

According to another embodiment of the invention, each of the cylinders 23 is combined with one of the cylinders 13 to form a single double acting cylinder, the function of the pistons 24 being taken over by the studs 10. In such a construction cylinder 13 is closed at the left end thereof beyond piston 12 and a hydraulic connection is made between line 25 and the enclosed space thus provided to the left of each of the pistons 12. Additionally, in such an embodiment the member 13 is affixed to the flange 15 as by means of a threaded connection therewith so as to make it possible for the member 13 to exert a tensile as well as a compressive stress on that flange.

It will thus be seen that the invention provides a turbine (whether for transformation of mechanical energy of rotation into fluid flow as in a blower or vice versa), which remotely controlled means are provided for axially shifting the turbine rotor and its housing 7 with respect to an outer housing 8. A stud (or studs) 10 affixed to the outer housing 8 permits the rotor housing 7 to be stressed, for operation, at a flange 15 thereof against outer housing 8 with the aid of spacer means 20 which can be withdrawn by remote control of the pressure applied to piston 17. Piston 17 is disposed within the cylindrical member 16 which is affixed to the stud outboard of the flange. Upon such withdrawal of the spacer means, the bearing or rotor housing can be shifted to retract the flange 15 from the housing 8, for example by operation of cylinder 23, so as to provide a seal between the turbine rotor and the casing therefor. When the turbine rotor is in operating position, the two housings are stressed together, the stress being transmitted from the stud to the housing 7 through the nut 11, hollow cylindrical member 16, spacers 20, and hollow cylindrical member 13. The spacers thus fit with negative clearance between the members 16 and 13.

To assist in removal of the spacer means and to effect restoration of the housings 7 and 8 to the operating position shown in FIG. 2, a cylinder 13 is movably disposed about the stud, outboard of the flange, and a piston 12 is affixed to the stud within this cylinder. Since relative motion of the housings 7 and 8 is involved, the stud or studs can be affixed to either housing to pass through a flange on the other one.

While the invention has been described herein in terms of a preferred embodiment, the scope of the invention is rather set forth in the appended claims. In particular, the invention is not limited to use with a reactor.

I claim:

1. A turbine comprising a rotor, a bearing housing, bearings in said housing for support of said rotor, an outer housing in which said bearing housing is axially movable, said outer housing and bearing housing having complementary abutting surfaces extending at least in part radially of said rotor, means to stress said bearing housing against said outer housing at said surfaces, said stressing means including spacing means, and remotely controlled means to withdraw said spacing means.

2. A turbine comprising a rotor, a bearing housing, bearings in said housing for support of said rotor, an outer housing in which said bearing housing is axially movable, said outer housing and bearing housing having complementary abutting surfaces extending at least in part radially of said rotor, a stud affixed to one of said housing and passing through the other of said housings, a nut on said stud, removable spacer means engageable between said nut and the other of said housings to stress said housings together at said surfaces, and remotely controlled means to withdraw said spacer means from between said nut and the other of said housings.

3. Apparatus for effecting axial shift of a turbine rotor housing with respect to a stationary housing, said apparatus comprising a stud fixed in one of said housings, a flange on the other of said housings through which said stud passes parallel to the rotor axis, a cylinder fixed to said stud outboard of said flange, a piston disposed within said cylinder, a plurality of spacing members dimensioned to fit with negative clearance between said cylinder and flange, said spacing members being movable radially of said stud upon advance of said piston toward said flange, and means to supply a fluid under pressure to the interior of said cylinder.

4. Apparatus for effecting axial shift of a turbine rotor housing with respect to a stationary housing, said apparatus comprising a stud fixed in said stationary housing, a flange on said rotor housing through which said stud passes parallel to the rotor axis, a cylinder movably disposed about said stud outboard of said flange, a piston affixed to said stud within said cylinder, a pressure fluid connection to said cylinder, a nut on said stud outboard of said cylinder, spacer means between said nut and cylinder, and remotely controlled means to withdraw said spacer means.

5. Apparatus for effecting axial shift of a turbine rotor housing with respect to a stationary housing, said apparatus comprising a stud fixed in said stationary housing, a flange on said rotor housing through which said stud passes parallel to the rotor axis, a cylinder movably disposed about said stud outboard of said flange, a piston affixed to said stud within said cylinder, a pressure fluid connection to said cylinder, a cylinder affixed to said stud outboard of said movable cylinder, a spacing member between said cylinders, a pressure fluid connection to the interior of said fixed cylinder, and an annular piston within said fixed cylinder.

6. A turbine according to claim 2 including a cylinder affixed to the other of said housings, a piston in said cylinder adapted to bear against said one housing, and means to supply a fluid under pressure to said cylinder.

7. Apparatus for effecting axial shift of a turbine rotor housing with respect to a stationary housing, said apparatus comprising a stud fixed in said stationary housing, a flange on said rotor housing through which said stud passes, a cylinder disposed about said stud outboard of said flange, said cylinder being closed at both ends thereof about said stud and being affixed to said flange, a piston affixed to said stud within said cylinder, separate means to supply fluid under pressure to the interior of said cylinder on opposite sides of said piston, a nut on said stud outboard of said cylinder, spacer means removably insertable between said nut and cylinder, and remotely controlled means to withdraw said spacer means.

8. A turbine comprising rotor bearings for support of a rotor, a rotor housing for support of said bearings, an outer housing in which said rotor housing is movable parallel to the axis of rotation of said rotor between operating and non-operating positions of the turbine, said rotor housing and outer housing having complementary abutting surfaces extending at least in part radially of said rotor, sealing means on said outer housing engageable with said rotor in the non-operating position of said rotor housing, means to stress said housings together at said surfaces in the operating position of said rotor housing, said stressing means including spacer means, and remotely controlled means for withdrawal of said spacer means.

References Cited
UNITED STATES PATENTS 3,088,416   5/1963   Danis _____ 103—111 X
3,130,679   4/1964   Sence.

EVERETTE A. POWELL, JR., *Primary Examiner.*